No. 728,915. PATENTED MAY 26, 1903.
E. G. HEWITT.
ALTITUDE INSTRUMENT.
APPLICATION FILED JULY 8, 1902.
NO MODEL.
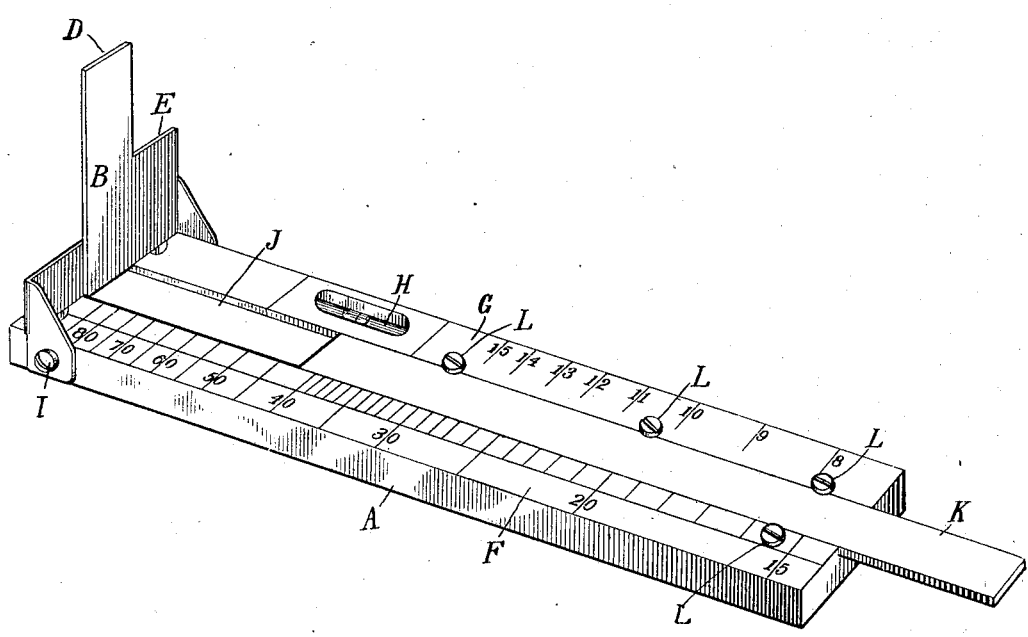
Witnesses:
Raphael Netter
S. S. Dunham
Edward G. Hewitt, Inventor
by Kerr, Page & Cooper, Attys No. 728,915. Patented May 26, 1903.

UNITED STATES PATENT OFFICE.

EDWARD G. HEWITT, OF NEW YORK, N. Y.

ALTITUDE INSTRUMENT.

SPECIFICATION forming part of Letters Patent No. 728,915, dated May 26, 1903.

Application filed July 8, 1902. Serial No. 114,780. (No model.)

*To all whom it may concern:*

Be it known that I, EDWARD G. HEWITT, a citizen of the United States, residing at New York, county of Kings, State of New York, have invented certain new and useful Improvements in Altitude Instruments, of which the following is a specification, reference being had to the drawing accompanying and forming part of the same.

The object of my invention is to provide a simple and inexpensive instrument for finding the altitude of an object, particularly of the sun; and it consists of the novel features and combinations hereinafter described, and more particularly pointed out in the claims.

In the drawing I show a perspective view of one form of my invention, in which—

A is a base of suitable size, convenient dimensions being eight inches long by one and one-half inches wide. At one end of the base, perpendicularly thereto, is arranged a stop B, having two steps D E. For a base of the size mentioned above the steps may be conveniently two inches and one inch high, respectively. It is obvious that if the instrument is placed with the stop toward the sun and the other end in line therewith the shadows of the steps will terminate at different points on the base, and by means of graduations on the latter the altitude of the sun above the horizon may be readily determined. The graduations may be easily located. For example, if it is desired to find the point at which the shadow of D will fall when the sun's altitude is fifteen degrees we have one side—two inches—of a right triangle and the opposite angle—fifteen degrees—to find the base. The solution of a simple and well-known trigonometrical formula with these values inserted will give the distance of the shadow from the foot of the perpendicular. In this way other points may be found and marked on the base, as suits the purposes or convenience of the user. In the device shown in the drawing the shadow of the step D is read on the graduations of the side F and the shadow E on the side G.

It is of course necessary in order to obtain the most accurate readings of which the instrument is capable that the base should lie exactly in the plane of the horizon. In order to readily arrange the instrument in this position a small spirit-level is attached to the base, as H. By attaching the stop to the base by means of pivots, one of which is shown at I, the stop can be folded down upon the base, and the instrument may thus be conveniently carried in the pocket.

The instrument shown is provided with a longitudinal groove J, in which works a slide K, held against vertical displacement by any suitable means, as by the screws L. The groove and slide furnish means for keeping a record of observations—as, for example, the altitude of the sun at different times of the day or at the same hour on different days, as the altitude at noon throughout the year. In the groove may be recorded, for example, the extreme variations of the sun's altitude from solstice to solstice, while the daily, weekly, or monthly record may be kept on the slide. When the record on the slide is completed, the date is marked thereon and a new slide substituted, the other being preserved. Thus a record of observations may be readily kept for the year, and to compare the same it is only necessary to insert the proper slide, when the position of the former shadow and that of the present one may be compared.

To find the height of an object, the altitude of the sun is first found, which is of course the angular altitude of the object with reference to its shadow. The distance of the shadow's extremity from the base of the perpendicular passing through that part of the object which casts the extremity of the shadow is then measured. These values substituted in a simple and well-known formula of trigonometry will give the desired height.

It will be seen that my device while extremely simple in construction and operation is well adapted for its intended use.

I have described herein a convenient embodiment of my invention; but it is obvious that numerous other forms are within the scope of my invention, and I therefore do not consider myself limited to the form shown.

What I claim is—

1. In a pocket instrument for determining altitudes, in combination, a base having graduations thereon, and a pivoted stop adapted to be arranged substantially perpendicular to said base, having means for casting a plurality of shadows of different lengths on said base, whereby the angular altitude of the luminous body causing the shadows may be determined by comparing the ends of said shadows with the graduations on the base, as set forth.

2. In a pocket instrument for determining altitudes, in combination, a base having graduations thereon, a pivoted stop adapted to be arranged substantially perpendicular to said base, having means for casting a plurality of shadows of different lengths on said base, whereby the angular altitude of the luminous body causing the shadows may be determined by comparing the ends of said shadows with the graduations on the base, a longitudinal groove in said base, and a slide in said groove on which a record of observations may be kept, as set forth.

EDWARD G. HEWITT.

Witnesses:
 S. S. DUNHAM,
 BENJAMIN MILLER.